US008666699B1

(12) United States Patent
Grube et al.

(10) Patent No.: US 8,666,699 B1
(45) Date of Patent: Mar. 4, 2014

(54) OPTIMUM SENSOR LAYOUT FOR DETECTING AN INTRUDER

(75) Inventors: Robert W. Grube, Edmonds, WA (US); Raju S. Mattikalli, Sammamish, WA (US); Paul Z. Thunemann, Snoqualmie, WA (US); Paul S. Fussell, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 511 days.

(21) Appl. No.: 13/016,326

(22) Filed: Jan. 28, 2011

(51) Int. Cl.

| | |
|---|---|
| ***G01M 99/00*** | (2011.01) |
| ***G06F 17/40*** | (2006.01) |
| ***G06F 19/00*** | (2011.01) |
| ***G06F 11/00*** | (2006.01) |

(52) U.S. Cl.
USPC ............ 702/182; 340/541; 340/573.1; 702/1; 702/127; 702/179; 703/1

(58) Field of Classification Search
USPC .................... 73/732.1, 865.8, 866.3; 181/125; 340/500, 540, 541, 565, 573.1, 686.1, 340/686.6, 870.01, 870.07, 870.16; 382/100, 103; 702/1, 127, 150, 179, 702/181, 182; 703/1; 708/100, 105, 200
IPC ........... A01K 29/00,29/005; G01D 7/00, 21/00; G01M 99/00; G06F 11/00, 11/30, 11/32, G06F 17/00, 17/40, 19/00; G08B 13/00
See application file for complete search history.

(56) References Cited

U.S. PATENT DOCUMENTS

| | | | | |
|---|---|---|---|---|
| 3,131,376 A * | 4/1964 | Du Vall | ......................... | 714/715 |
| 5,752,513 A * | 5/1998 | Acker et al. | .................. | 600/424 |
| 7,676,064 B2 * | 3/2010 | Neff et al. | ...................... | 382/103 |
| 7,961,137 B2 * | 6/2011 | Grube et al. | ..................... | 342/59 |
| 8,301,400 B2 * | 10/2012 | Beard et al. | ...................... | 702/35 |
| 8,370,111 B2 * | 2/2013 | Mattikalli et al. | ............ | 702/188 |
| 2007/0269077 A1 * | 11/2007 | Neff et al. | ...................... | 382/103 |
| 2008/0255777 A1 * | 10/2008 | Beard et al. | ...................... | 702/35 |
| 2009/0244070 A1 * | 10/2009 | Mattikalli et al. | ............ | 345/441 |
| 2010/0106420 A1 * | 4/2010 | Mattikalli et al. | ................ | 702/2 |
| 2010/0117889 A1 | 5/2010 | Grube et al. | | |

OTHER PUBLICATIONS

Mattikalli, et al., "Optimal Sensor Selection and Placement for Perimeter Defense", Proceedings of the 3rd Annual, IEEE Conference on Automation Science and Engineering, Scottsdale, AZ, Sep. 22-25, 2007.

* cited by examiner

*Primary Examiner* — Edward Cosimano
(74) *Attorney, Agent, or Firm* — Charles L. Moore; Moore & Van Allen PLLC

(57) ABSTRACT

A method for optimum sensor layout for detecting an intruder may include selecting candidate sensor locations within a representation of an area of regard. The method may also include determining a sub-region of detection for each sensor based on a preset probability of detection of the intruder traversing a sub-region associated with each sensor. The method may additionally include determining each pair of sensors with overlapping sub-regions of detection and determining a lowest probability of detection for any path between each pair of sensors with overlapping sub-regions of detection. The method may further include determining an optimum layout of sensor locations or sensors from candidate sensor locations based on a path of the lowest probability of detection for any path between each pair of sensors with overlapping sub-regions of detection.

20 Claims, 9 Drawing Sheets

OPTIMUM SENSOR LAYOUT FOR DETECTING AN INTRUDER

BACKGROUND

Aspects of the present disclosure relate to sensors for detecting an intruder or an intruder crossing a boundary, and more particularly to a system, method and computer program product for optimally laying out a plurality of sensors for detecting an intruder.

Detecting intruders entering or traversing a geographic area of interest is a significant concern for security reasons. This is of particular interest in border security. Border security involves detecting illegal human and vehicular traffic. One proposed methodology for detecting such traffic involves using a set of scanning radar systems. Such radar systems can be costly and typically are expected to be in fixed locations. Accordingly, eventually intruders may gain knowledge of the fixed locations of such radar systems and determine ways to evade or at least significantly reduce the probability of detection by following certain paths to enter and traverse the area under surveillance. Existing surveillance systems use a notion of coverage that is based on line-of-sight which has limitations with respect to monitoring and detection of human and vehicular traffic. One limitation is that such systems do not consider the probabilistic detection performance of the sensor. Another aspect not considered or taken into account by such systems is the evasive maneuvering of the intruder or target.

BRIEF SUMMARY

According to one aspect of the present disclosure, a computational algorithm stored on a computer program product or operable on a processing device analytically optimizes locations of area monitoring sensors using a game theoretical approach wherein an evasive strategy of an intruder is taken into consideration. A lay down or layout of minimal area-monitoring sensors are located at selected locations to provide a predetermined probability of detection by considering all evasive trajectories or paths an intruder or target may take to traverse an area being monitored by the sensors without being detected.

According to another aspect of the present disclosure, a method for optimum sensor layout for detecting an intruder may include selecting candidate sensor locations within a representation of an area of regard. The method may also include determining a sub-region of detection for each sensor based on a preset probability of detection of the intruder traversing a sub-region associated with each sensor. The method may additionally include determining each pair of sensors with overlapping sub-regions of detection and determining a lowest probability of detection for any path between each pair of sensors with overlapping sub-regions of detection. The method may further include determining an optimum layout of sensor locations or sensors from candidate sensor locations based on a path of the lowest probability of detection for any path between each pair of sensors with overlapping sub-regions of detection.

According to another aspect of the present disclosure, a system for optimum sensor layout for detecting an intruder may include a processing device and a module operating on the processing device for optimum sensor layout for detecting the intruder. The module for optimum sensor layout for detecting the intruder may include a module for selecting candidate sensor locations within a representation of an area of regard. The module for optimum sensor layout for detecting the intruder may also include a module for determining a sub-region of detection for each sensor based on a preset probability of detection of the intruder traversing a sub-region associated with each sensor. The module for optimum sensor layout for detecting the intruder may additionally include a module for determining each pair of sensors with overlapping sub-regions of detection and a module for determining a lowest probability of detection for any path between each pair of sensors with overlapping sub-regions of detection. The module for optimum sensor layout for detecting the intruder may further include a module for determining an optimum layout of sensor locations or sensors from candidate sensor locations based on a path of the lowest probability of detection for any path between each pair of sensors with overlapping sub-regions of detection.

According to a further aspect of the present disclosure, a computer program product for optimum sensor layout for detecting an intruder may include a computer readable storage medium having computer readable program code embodied therewith. The computer readable program code may include computer readable program code configured to select candidate sensor locations within a representation of an area of regard. The computer readable program code may also include computer readable program code configured to determine a sub-region of detection for each sensor based on a preset probability of detection of the intruder traversing a sub-region associated with each sensor. The computer readable program code may also include computer readable program code configured to determine each pair of sensors with overlapping sub-regions of detection. The computer readable program code may additionally include computer readable program code configured to determine a lowest probability of detection for any path between each pair of sensors with overlapping sub-regions of detection. The computer readable program code may further include computer readable program code configured to determine an optimum layout of sensor locations or sensors from candidate sensor locations based on a path of the lowest probability of detection for any path between each pair of sensors with overlapping sub-regions of detection.

BRIEF DESCRIPTION OF THE SEVERAL VIEWS OF THE DRAWINGS

The present disclosure is further described in the detailed description which follows in reference to the noted plurality of drawings by way of non-limiting examples of embodiments of the present disclosure in which like reference numerals represent similar parts throughout the several views of the drawings and wherein.

DETAILED DESCRIPTION

Figure 1:
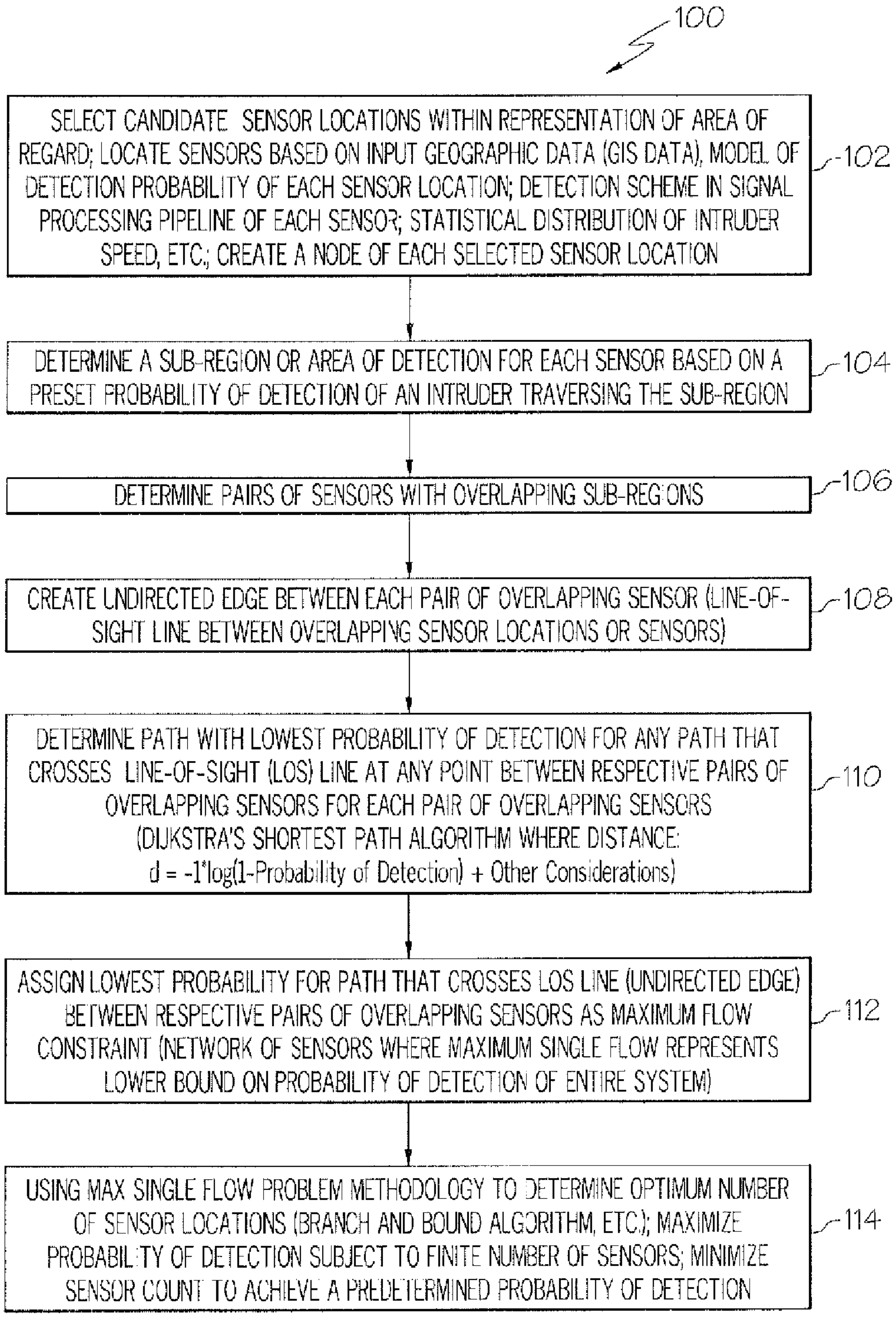
FIG. 1 is a flow chart of an example of a method for optimum sensor layout for detecting an intruder in accordance with an embodiment of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An optimal area-monitoring sensor lay down or lay out may characterize the monitoring and detection function as an asymmetric, sequential, non-cooperative game. That is, a first player (the planner) decides where to place the sensors, such as radars or similar devices, at a fixed maximum cost, with the objective of having the highest probability of detection of the intruder or target. Because the locations and capabilities of the sensors are accessible information, the opponent may be assumed to have perfect knowledge, and will choose a strategy to minimize his probability of detection. The strategy of the planner should then be to maximize the minimum probability of detection across all trajectories or paths traversing the area being monitored. Because the placement of assets or sensors is expensive, the game theoretic approach is to focus on a single strategy for the planner that will have the greatest success in an infinite game. The planner's strategy involves choosing a subset of sensor locations from a large pre-computed set of candidate locations. The subsets of candidate locations may be analyzed as described herein for detection weaknesses. A graph of detection probabilities may be generated between pairs of candidate locations and an optimization procedure or algorithm may be performed, such as a min-cut optimization on the graph to achieve a best sensor lay down or layout strategy that provides the highest probability of detection base on the number of sensors and location of the sensors.

FIG. 1 is a flow chart of an example of a method 100 for optimum sensor layout for detecting an intruder in accordance with an embodiment of the disclosure. In block 102, candidate sensor locations may be selected within a representation of the area of regarding or the area of interest being monitored for detection of an intruder. The sensors may be located based on input data. The input data may include but is not necessarily limited to geographic data, for example geographic information systems (GIS) information, such as 3D terrain geometry, roads, rivers, border lines, etc. Other input data may include candidate sensor locations, a model of detection probability of each individual sensor, a chosen detection scheme (e.g. 3 consecutive detections) in the signal processing pipeline of the sensors, a statistical distribution of intruder speed and any other input data that may be useful in determining an optimum number of sensors and sensor locations to provide the highest probability of detection at the lowest cost. The sensors may be radar systems or similar systems for detecting human and vehicular traffic. A node may be created for each selected sensor location in the representation of the area of regard.

Figure 2A:
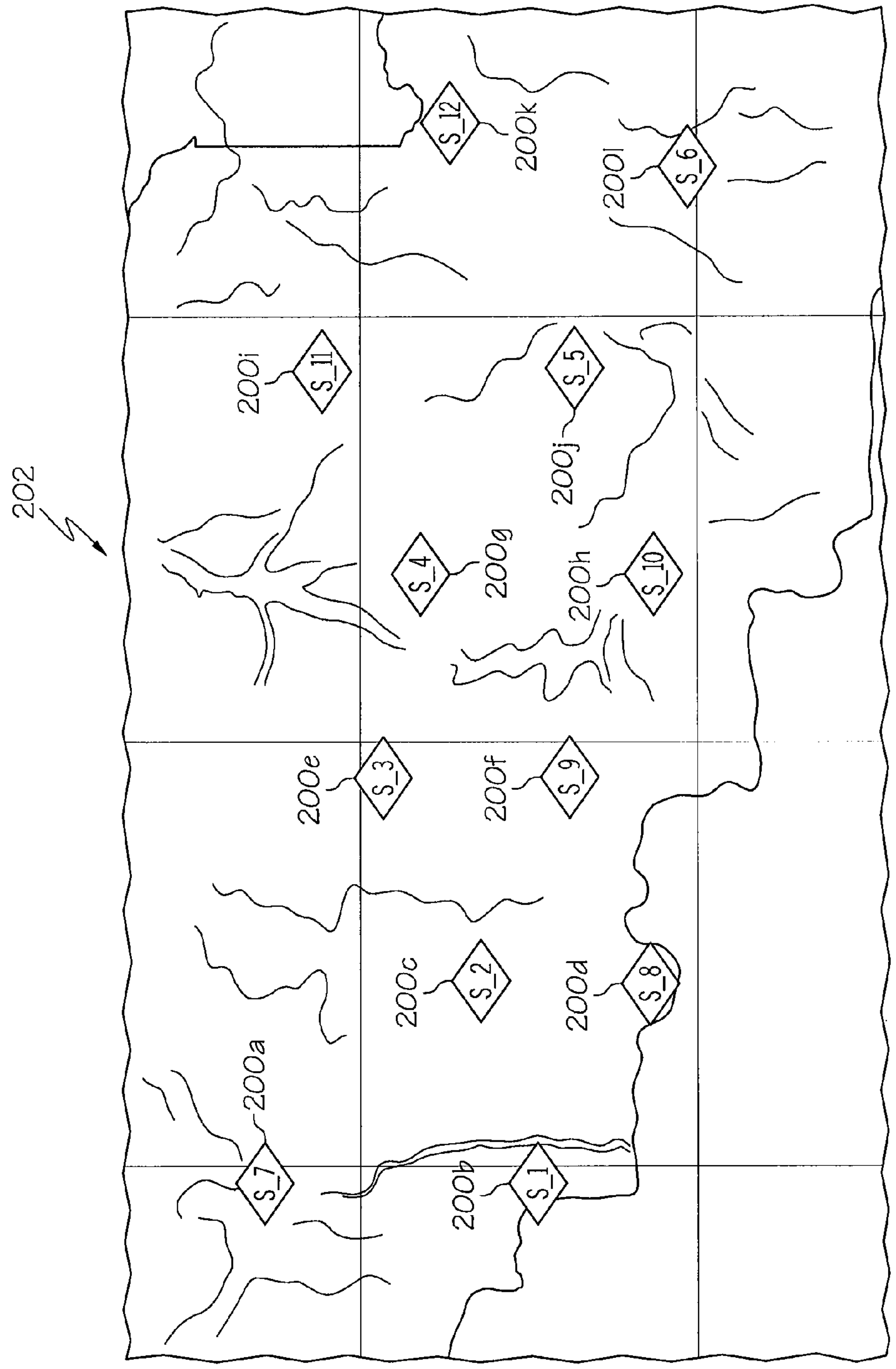
FIGS. 2A-2G are illustrative examples of results of steps of the method of FIG. 1 in accordance with an embodiment of the disclosure.

Referring also to FIG. 2A, FIG. 2A illustrates selected candidate sensor locations 200*a*-200*l* or nodes within a representation of an area of regard 202 or area being monitored for detection of intruders. In the example illustrated in FIG. 2A the representation of the area is a topological map of the area. Other representations of the area being monitored may be used, although showing the selected candidate sensor locations 200*a*-200*l* on a map of the area under surveillance or area of regard 202 may be the most informative and representative of the monitoring system.

Figure 2B:
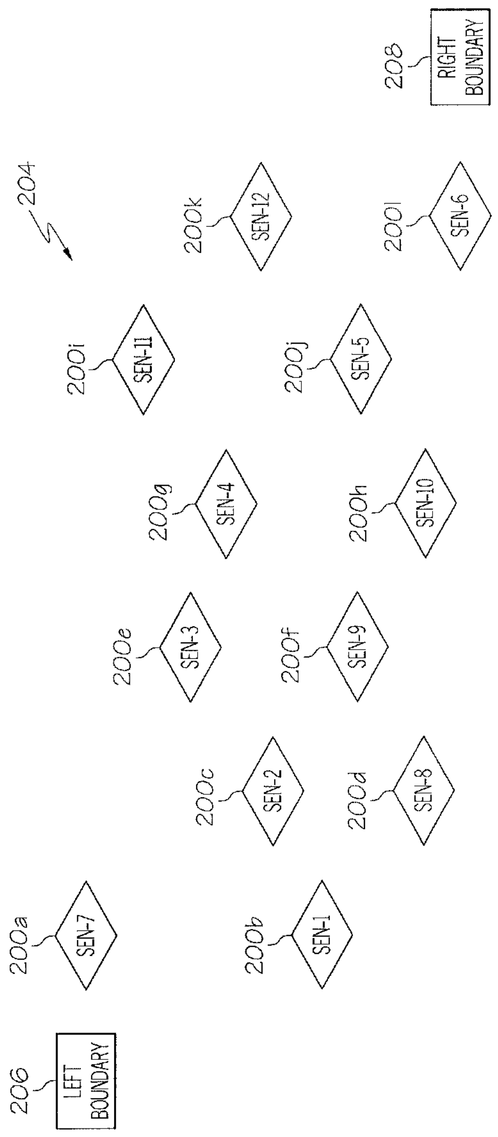

FIG. 2B illustrates another example of a representation 204 or graph of the selected candidate sensor locations 200*a*-200*l* or sensors. In this representation only the sensors 200*a*-200*l* are illustrated along with a representation of the left boundary 206 and right boundary 208 of the surveillance area 204 or area of regard. The sensors 200*a*-200*l* may be numbered in the representation 204 or graph as illustrated in FIGS. 2A and 2B.

Figure 2C:
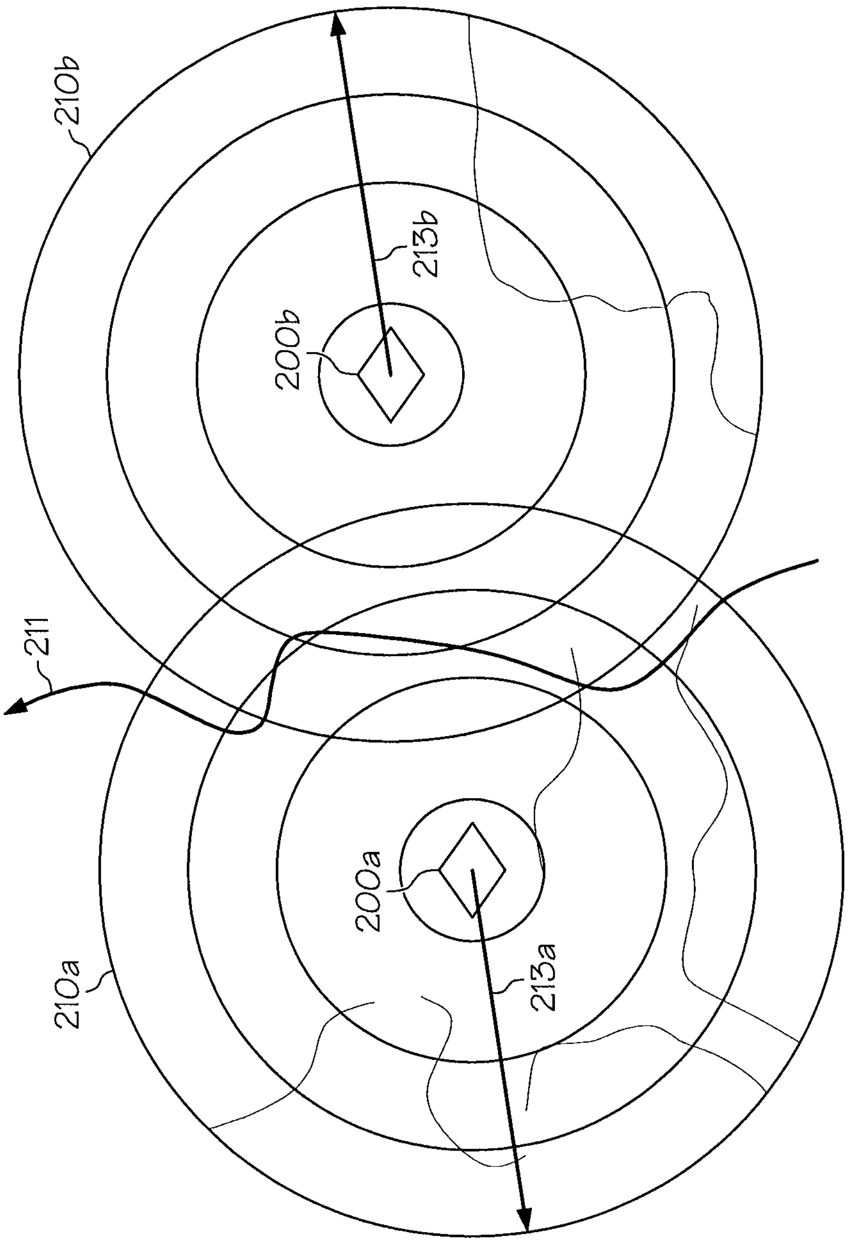

In block 104, a sub-region or area of detection for each sensor based on a preset probability of detection of an intruder traversing the sub-region may be determined. In block 106, pairs of sensors with overlapping sub-regions of detection may be determined. FIG. 2C is an example of a pair of sensors 200*a* and 200*b* with overlapping sub-regions of detection 210*a* and 210*b*. A possible path for traversing between the pair of sensors 200*a* and 200*b* is illustrated by arrow 211. The path 211 may take into account evasive maneuvering by the intruder to avoid detection and other considerations as described herein. An expected or estimated range of detection for a predetermined probability of detection for each sensor 200*a* and 200*b* is illustrated by arrows 213*a* and 213*b* respectively. The probability of detection may vary based on the distance or range from the sensor as well as other factors, such as terrain or other objects in the line of sight.

Figure 2D:
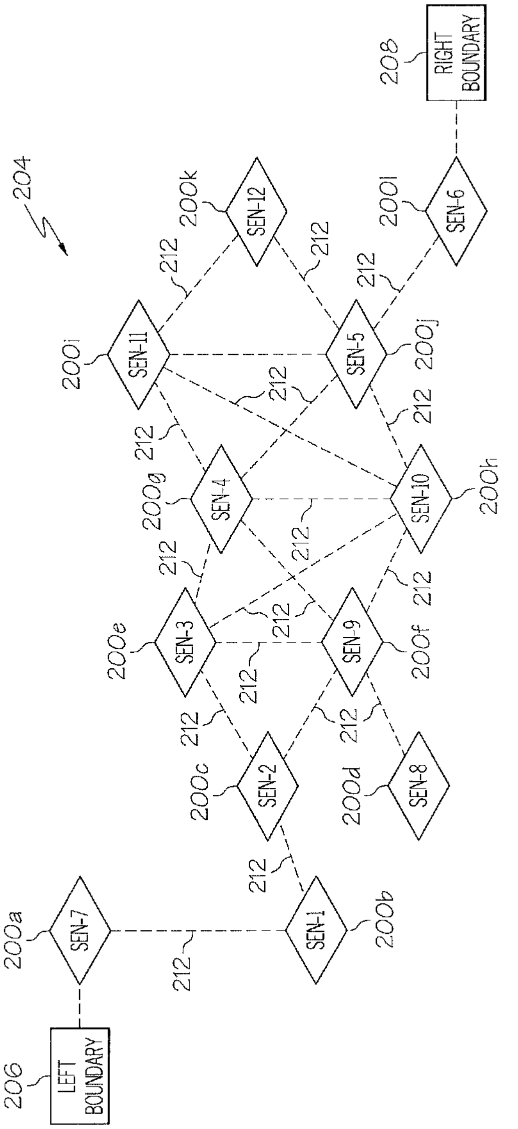

In block 108, an undirected edge may be created between each pair of overlapping sensors. The undirected edge may be a line-of-sight (LOS) line between the overlapping sensors or sensor locations. FIG. 2D illustrates an undirected edge or LOS line 212 between each pair of sensors 200*a*-200*l* with an overlapping sub-region of detection.

In block 110, a path with a lowest probability of detection of an intruder for any path that crosses the undirected edge or LOS line 212 between respective pairs of overlapping sensors 200*a*-200*l* or sensor locations may be determined for each pair of overlapping sensors. A shortest path algorithm, such as Dijkstra's shortest path algorithm or similar techniques may be used to determine the lowest probability of detection for any path that crossed the LOS line 212. The distance used in the Dijkstra algorithm may be d=−1*log(1−Probability of Detection)+Other Considerations. In this regard, for every pair of sensors with overlapping sub-regions of detection a calculation is performed to provide the probability of detection assuming the intruder can determine or knows the path between the overlapping sensors with the lowest probability of detection and will use this path. Other considerations may include but are not necessarily limited to taking into account the terrain of the different paths between overlapping sensors, proximity to roads, water or rivers or other features that may influence a path chosen by an intruder. Some paths may be more difficult than other or take a longer time to traverse. Accordingly, time duration and difficulty for traversing the different paths may also be a consideration as well as other parameters that may influence a path chosen by an intruder in traversing between the overlapping sensors and trying to evade detection. Accordingly, the method 100 considers or takes into account evasive maneuvering by the intruder to avoid detection.

Figure 2E:
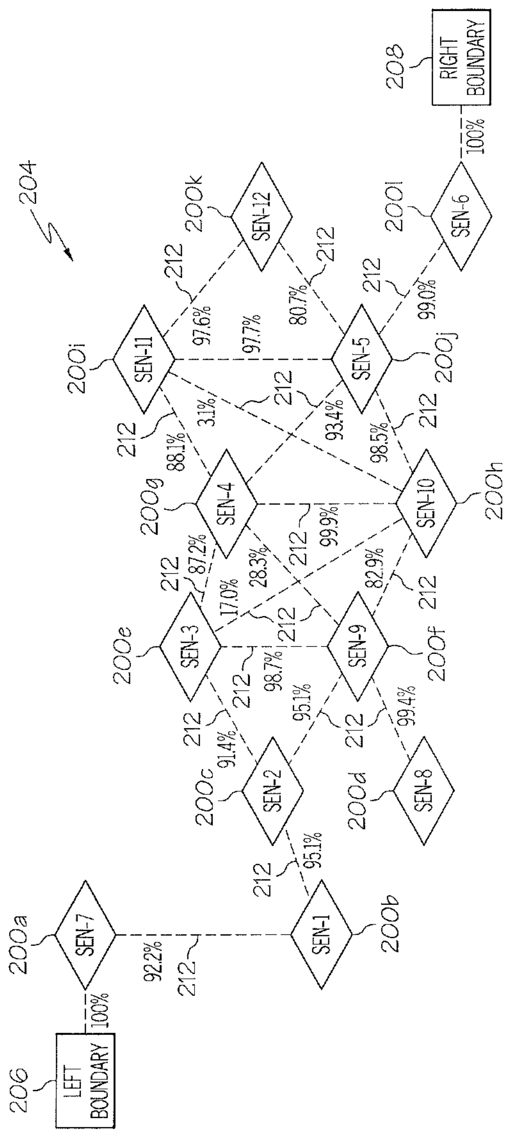

In block 112, the lowest probability of detection for the path that crosses the LOS line 212 or undirected edge may be assigned between the respective pairs of overlapping sensors as a maximum flow constraint. The lowest probability of detection assigned to the pairs of sensors may be represented or shown in the graph of the sensor layout 204 in association with the LOS line 212 as illustrated in FIG. 2E. The network of sensors 200*a*-200*l* now represents a surveillance system where maximum single flow represents a lower bound on probability of detection of the entire system. The probability of detection can be maximized subject to a finite number or selected number of sensors or the sensor count can be minimized subject to achieving at least achieving a selected probability of detection.

Figure 2F:
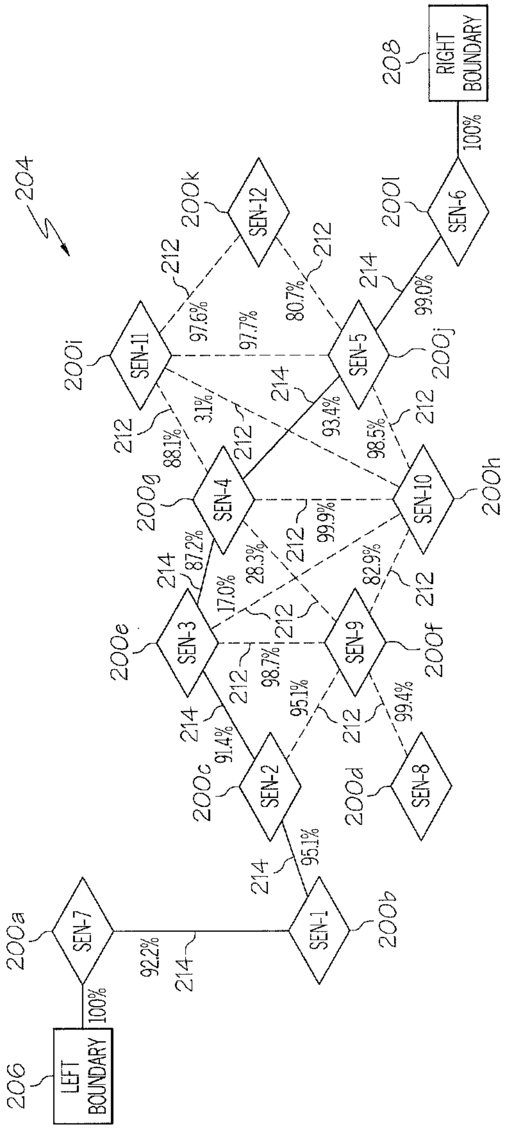

In block 114, a maximum single flow problem methodology may be used to determine an optimum number of sensors and sensor location. For example, a branch and bound technique or algorithm may be used to determine the optimum number of sensors and sensor locations from the selected candidate sensor locations. In another embodiment, a min-cut optimization of the graph 204 may be used to achieve the optimum or best sensor lay down strategy. FIG. 2F illustrates the results of performing the maximum single flow problem methodology on the graph 204 of the selected candidate sensors and sensor locations 200*a*-200*l*. In FIG. 2F, the max single flow problem is solved with the constraint that flow passes through at most seven sensors or an intruder will traverse through at most seven sensors. The optimum or best sensors and sensor locations resulting from the maximum single flow analysis are illustrated in FIG. 2F as being connected by a solid line 214 between pairs of overlapping sensors 200*a*-200*l*. In optimization theory, a solution to the maximum flow problem is to find a feasible flow through a single-source, single-sink flow network that is maximum.

Figure 2G:
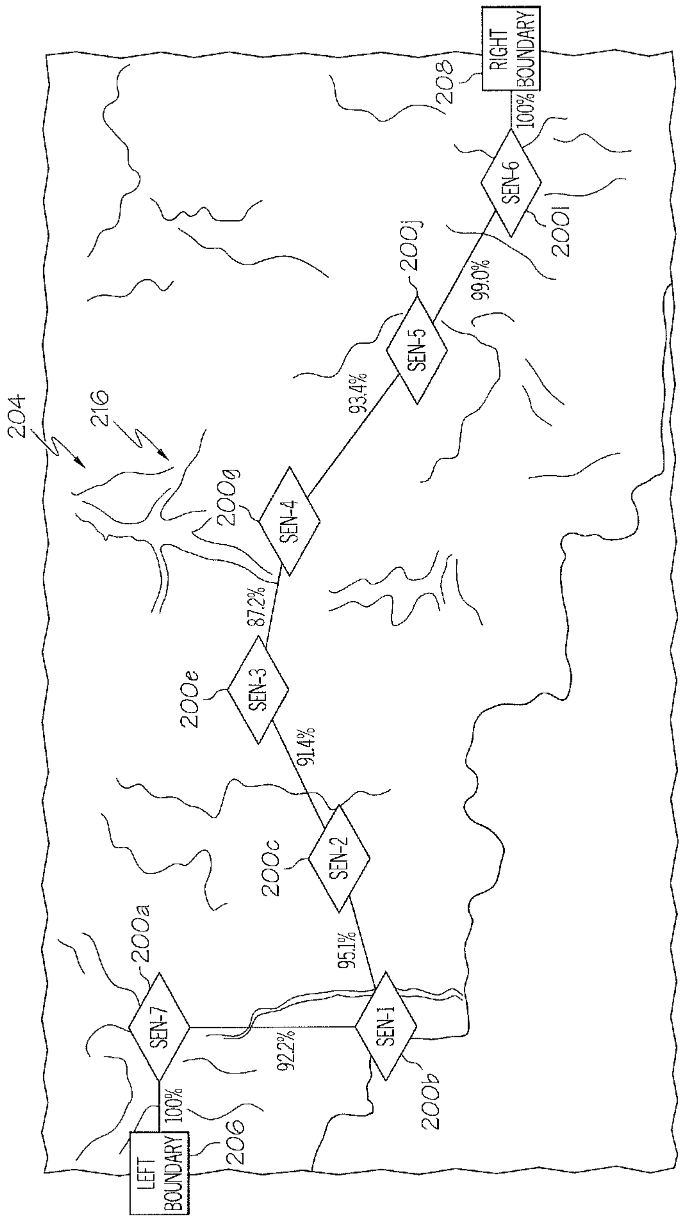

FIG. 2G illustrates the optimum sensor lay down or layout represented on a representation of the area of regard or area under surveillance. In the example illustrated in FIG. 2G the representation of the area is a map 216 of the area.

Figure 3:
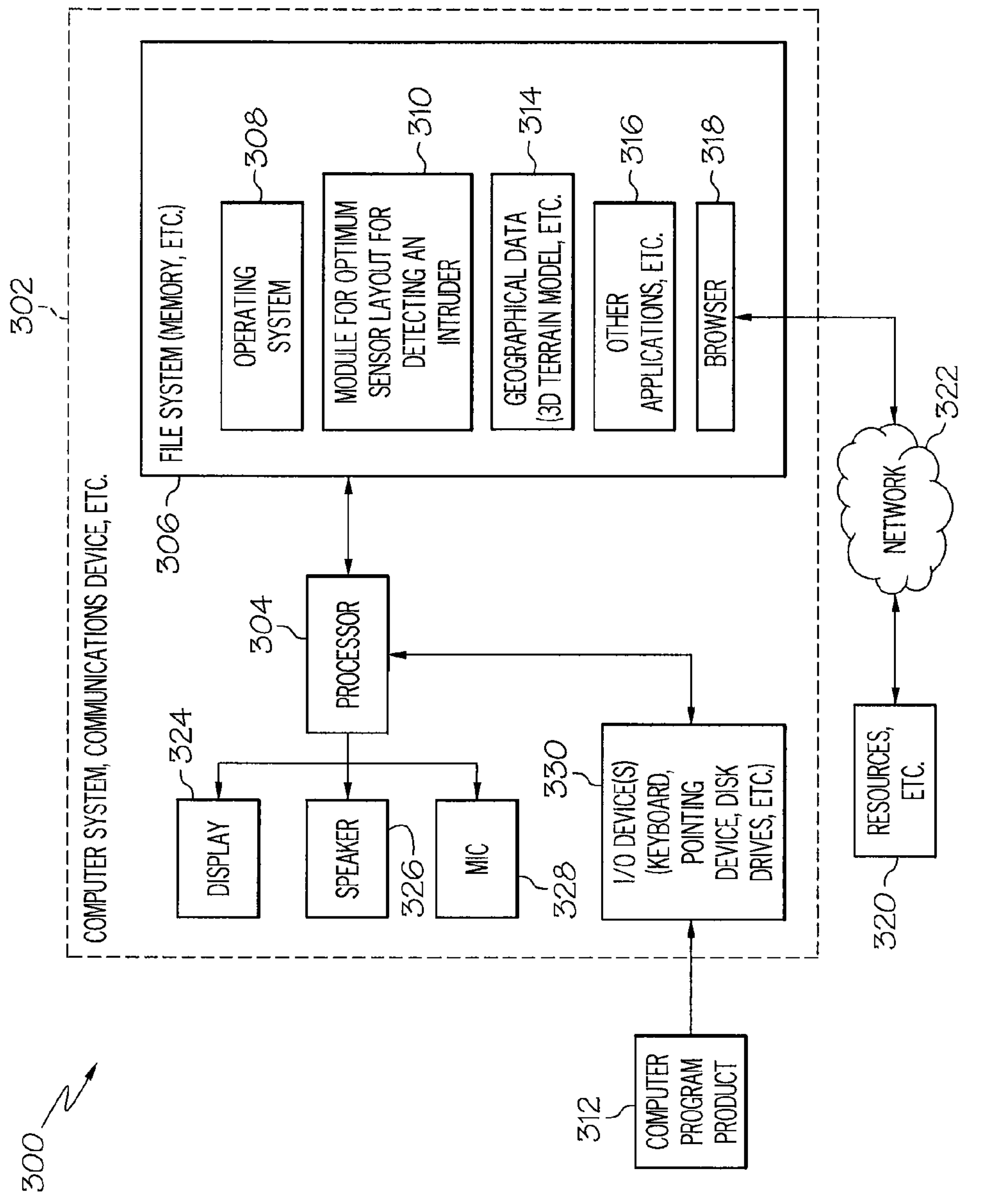
FIG. 3 is a block schematic diagram of an example of a system for optimum sensor layout for detecting an intruder in accordance with an embodiment of the present disclosure.

FIG. 3 is a block schematic diagram of an example of a system 300 for optimum sensor layout for detecting an intruder in accordance with an embodiment of the present disclosure. The method 100 of FIG. 1 may be embodied in and performed by the system 300. The system 300 may include a computer system 302 for use by a user to determine the optimum sensor layout and to present the sensor layout similar to that illustrated in FIG. 2G. The computer system 302 may be any type of computing device or communications device or the like capable of performing the functions or operations described herein.

The computer system 302 may include a processor 304 to control operation of the computer system 302 and a file system 306, memory or similar data storage device. An operating system 308 may be stored on the file system 306 for running or operating on the processor 304. A module for optimum sensor layout for detecting an intruder 310 may be stored on the file system 306 for operation on the processor 304 to perform the functions and operations described herein. The method 100 may be embodied in the module 310. The module for optimum sensor layout for detecting an intruder 310 may also be stored or embodied on computer readable storage medium or computer program product including a computer readable storage medium similar to that previously described, such as computer program product 312.

A database 314 including geographical data similar to that previously described may also be stored on the file system 306 for use by the module 310 to provide a representation of the area of regard similar to that previously described and illustrated in FIG. 2G. Other data or information useful in determining the optimum layout of sensors for detecting an intruder similar to that described herein may also be stored on the file system 306.

Other applications 316, software programs or the like may also be stored on the file system 306 for operation on the processor 304. A web or Internet browser 318 may also be stored on the file system 306 for accessing one or more resources 320 via a network 322. The resources 320 may provide data, such as geographical data or other information for performing the functions and operations described herein. The network 322 may be the Internet, intranet or other network.

The computer system 302 may also include a display 324 for presenting the sensor layouts or sensor graphs and other features described herein. The computer system 302 may also include a speaker system 326 for presenting any audio content. The computer system 302 may additionally include a microphone 328 for the user to aurally communicate via the computer system 302.

The computer system 302 may further include one or more input devices, output devices or combination input/output devices, collectively I/O devices 330. The I/O devices 330 may include a keyboard, pointing device, such as a mouse or other computer pointing device, disk drives and any other devices to permit a user to interface with and control operation of the computer system 302 and network resources 320.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A method for optimum sensor layout for detecting an intruder, comprising:

selecting, by a programmed computer device, candidate sensor locations within a representation of an area of regard;

determining, by the programmed computer device, a sub-region of detection for each sensor based on a preset probability of detection of the intruder traversing a sub-region associated with each sensor;

determining, by the programmed computer device, each pair of sensors with overlapping sub-regions of detection;

determining, by the programmed computer device, a lowest probability of detection for any path between each pair of sensors with overlapping sub-regions of detection; and determining, by the programmed computer device, an optimum layout of sensor locations from the candidate sensor locations based on a path of the lowest probability of detection for any path between each pair of sensors with overlapping sub-regions of detection.

2. The method of claim 1, further comprising displaying an optimum layout of sensors on a map of the area of regard.

3. The method of claim 1, further comprising creating an edge between each pair of sensors with overlapping sub-regions of detection.

4. The method of claim 3, wherein creating an edge between each pair of sensors with overlapping sub-regions of detection comprises providing line-of-site line between sensors of each pair of sensors with overlapping sub-regions of detection on the representation of the area of regard.

5. The method of claim 1, wherein determining a lowest probability of detection for any path between each pair of sensors with overlapping sub-regions of detection comprises determining a path with the lowest probability of detection for any path that crosses a line-of-sight line at any point between respective pairs of sensors with overlapping sub-regions of detection for each pair of sensors with overlapping sub-regions of detection.

6. The method of claim 5, further comprising using a shortest path algorithm to determine the lowest probability of detection of any path between each of sensors with overlapping sub-regions of detection.

7. The method of claim 6, wherein using the shortest path algorithm comprises using Dijkstra's shortest path algorithm where distance equals −1*log(1−a probability of detection) for a path between the sensors and considering other considerations.

8. The method of claim 5, further comprising assigning the lowest probability of detection for that path that crosses the line-of-sight line at any point between each respective pair of sensors with overlapping sub-regions of detection as a maximum single flow constraint for that pair of sensors.

9. The method of claim 8, further comprising representing the lowest probability of detection for any path between each respective pair of sensors with overlapping regions of detection in association with a representation of the line-of-sight line between each respective pair of sensors with overlapping sub-regions of detection.

10. The method of claim 8, wherein the maximum single flow constraint represents a lower bound on probability of detection for a sensor layout.

11. The method of claim 8, further comprising using a maximum single flow problem methodology for determining an optimum number of sensors and sensor locations from the maximum single flow constraint for each pair of sensors with overlapping sub-regions of detection.

12. The method of claim 11, wherein determining an optimum number of sensors and sensor locations comprises one of:

maximizing a probability of detection subject to a finite number of sensors and sensor locations; and minimizing a number of sensors to achieve a predetermined probability of detection.

13. The method of claim 11, wherein using the maximum single flow problem methodology comprises one of:

using a branch and bound algorithm; and using a min-cut optimization on a graphical representation of a sensor layout.

14. A system for optimum sensor layout for detecting an intruder, comprising:

a programmed processing device;

a module operating on the programmed processing device for optimum sensor layout for detecting the intruder, the module comprising:

a module for selecting candidate sensor locations within a representation of an area of regard;

a module for determining a sub-region of detection for each sensor based on a preset probability of detection of the intruder traversing a sub-region associated with each sensor;

a module for determining each pair of sensors with overlapping sub-regions of detection;

a module for determining a lowest probability of detection for any path between each pair of sensors with overlapping sub-regions of detection; and a module for determining an optimum layout of sensor locations from candidate sensor locations based on a path of the lowest probability of detection for any path between each pair of sensors with overlapping sub-regions of detection.

15. The system of claim 14, wherein the module for determining a lowest probability of detection for any path between each pair of sensors with overlapping sub-regions of detection comprises a module for determining a path with the lowest probability of detection for any path that crosses a line-of-sight line at any point between respective pairs of sensors with overlapping sub-regions of detection for each pair of sensors with overlapping sub-regions of detection.

16. The system of claim 15, further comprising a module for assigning the lowest probability of detection for that path that crosses a line-of-sight line between each respective pair of sensors with overlapping sub-regions of detection as a maximum single flow constraint for that pair of sensors.

17. The system of claim 16, further comprising a maximum single flow problem methodology for determining an optimum number of sensors and sensor locations from the maximum single flow constraint for each pair of sensors with overlapping sub-regions of detection.

18. A computer program product for optimum sensor layout for detecting an intruder, the computer program product comprising:

a non-transitory computer readable storage medium having computer readable program code embodied therewith, the computer readable program code comprising:

computer readable program code configured to select candidate sensor locations within a representation of an area of regard when executed;

computer readable program code configured to determine a sub-region of detection for each sensor based on a preset probability of detection of the intruder traversing a sub-region associated with each sensor when executed;

computer readable program code configured to determine each pair of sensors with overlapping sub-regions of detection when executed;

computer readable program code configured to determine a lowest probability of detection for any path between each pair of sensors with overlapping sub-regions of detection when executed; and computer readable program code configured to determine an optimum layout of sensor locations from candidate sensor locations based on a path of the lowest probability of detection for any path between each pair of sensors with overlapping sub-regions of detection when executed.

19. The computer program product of claim 18, wherein the computer readable program code configured to determine a lowest probability of detection for any path between each pair of sensors with overlapping sub-regions of detection comprises computer readable program code configured to determine a path with the lowest probability of detection for any path that crosses a line-of-sight line at any point between respective pairs of sensors with overlapping sub-regions of detection for each pair of sensors with overlapping sub-regions of detection.

20. The computer program product of claim 18, further comprising:

computer readable program code configured to assign the lowest probability of detection for that path that crosses a line-of-sight line at any point between each respective pair of sensors with overlapping sub-regions of detection as a maximum single flow constraint for that pair of sensors; and computer readable program code configured to apply a maximum single flow problem methodology for determining an optimum number of sensors and sensor locations from the maximum single flow constraint for each pair of sensors with overlapping sub-regions of detection.

* * * * *